Nov. 26, 1957  J. E. SUNDERLIN ET AL  2,814,737
MAGNETIC PULSE DOUBLING CIRCUIT
Filed Feb. 10, 1956
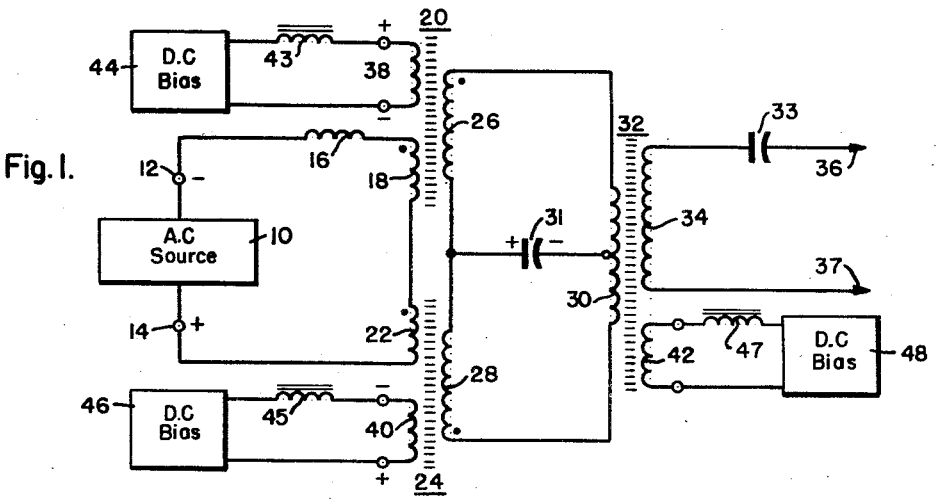
Fig. 1.
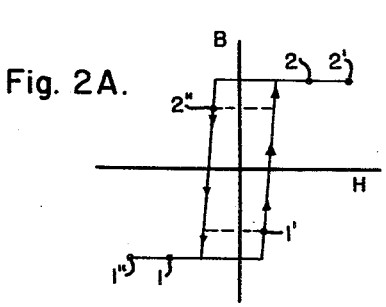
Fig. 2A.
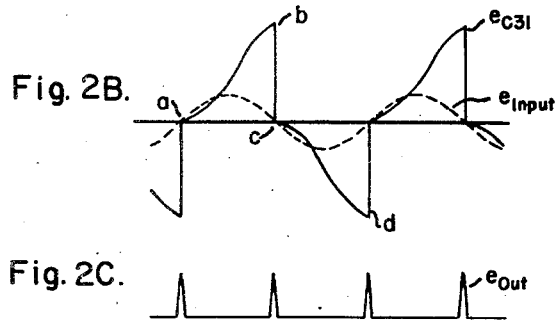
Fig. 2B.
Fig. 2C.
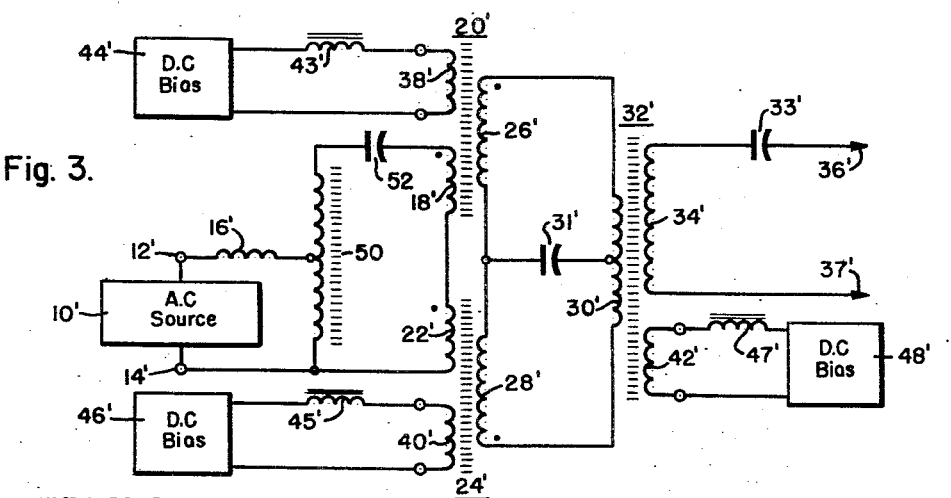
Fig. 3.
WITNESSES:
INVENTORS
Joseph E. Sunderlin and
Roy E. Lee.
BY
ATTORNEY United States Patent Office 2,814,737
Patented Nov. 26, 1957

2,814,737

MAGNETIC PULSE DOUBLING CIRCUIT

Joseph E. Sunderlin, Baltimore, and Ray E. Lee, Glen Burnie, Md., assignors to Westinghouse Electric Corporation, East Pittsburgh, Pa., a corporation of Pennsylvania Application February 10, 1956, Serial No. 564,759

7 Claims. (Cl. 307—106)

This invention relates to devices for transforming an alternating current input voltage into a pulsed output having a repetition rate equal to twice the input frequency and, more particularly, to a device of the type described wherein the output voltage pulses are of the same polarity.

Prior to this invention, thyratrons were generally used in conjunction with capacitors or pulse forming networks to produce the sharp output voltage pulses which are needed to drive a magnetron. Thyratrons, however, have a relatively large envelope which makes them bulky and space-consuming. In addition, the thyratron tube is relatively fragile; and, therefore, is sensitive to shock and vibration. Because of its fragile and space-consuming structure the thyratron can not be used in some installations where space conservation and rugged construction are required.

It is an object of this invention to provide a rugged, all magnetic pulse forming circuit which can be used to drive a magnetron and for other purposes.

An important object of the invention is to provide a magnetic circuit which transforms an alternating current input into a pulsed output having a pulse repetition rate equal to twice the input frequency.

A further object of the invention is to provide a pulse forming network having a high Q charging cycle.

A still further object of the invention is to provide a pulse forming circuit having minimized internal power consumption characteristics.

The above and other objects and features of the invention will become apparent from the following detailed description taken in connection with the accompanying drawings which form a part of this specification, and in which:

Figure 1 is a schematic circuit diagram of one embodiment of the invention;

Fig. 2A is an illustration of the rectangular hysteresis curve for the magnetic core material used in the transformers of the circuit shown in Fig. 1;

Fig. 2B is an illustration of voltage waveforms appearing across various components of the circuit of Fig. 1;

Fig. 2C is a voltage waveform illustrating the output voltage of the pulse generator of Fig. 1; and Fig. 3 is a schematic circuit diagram of another embodiment of the invention.

Referring to Fig. 1, the circuit shown includes a source of alternating current voltage 10 having two output terminals 12 and 14. In series between the terminals 12 and 14 are connected an inductor 16, the primary winding 18 of a first saturable core transformer 20 and the primary winding 22 of a second saturable core transformer 24. The cores of transformers 20 and 24 are formed from rectangular hysteresis loop material, hereinafter described.

The secondary windings 26 and 28 of transformers 20 and 24, respectively, are connected in a closed loop series arrangement with the primary winding 30 of a third or output saturable core transformer 32. Transformer 32 also has a core of rectangular hysteresis loop material.

The secondary winding 34 of transformer 32 is connected through capacitor 33 to two output terminals 36 and 38 across which a load impedance, not shown, is connected. Connected between the midpoint of winding 30 and the junction of windings 26 and 28 is a capacitor 31. Inductor 16 forms an alternating current charging circuit with capacitor 31 to bring about a high Q charging cycle for the circuit. The inductor 16 also acts as a high impedance to block the flow of energy from capacitor 31 back into source 10 when one of the transformers 20 or 24 saturates and lowers the impedance drop across the winding 18 or 22.

Inductively coupled to the core of transformers 20, 24 and 32 are tertiary bias windings 38, 40 and 42. Across the tertiary windings are connected direct current bias voltage sources 44, 46 and 48. Choke coils 43, 45, and 47 prevent the low A. C. impedance of the direct current voltage sources from shorting out their associated transformers. Like polarities of instantaneous induced voltages across windings 18, 22, 26 and 28 are indicated in the drawing by dots. Windings 18 and 26 are wound so that the polarity at corresponding ends of the windings will coincide, whereas windings 22 and 28 are wound so that the polarities at the corresponding ends of the windings will differ.

Operation of the circuit shown in Fig. 1 may best be understood by reference to Figs. 2A–2C. In Fig. 2A the rectangular hysteresis curve for the core material used in transformers 20, 24 and 32 is shown. In accordance with well-known magnetic theory, the quantity H represents the field intensity at any instant and is measured in ampere turns per unit of length. The quantity B represents the flux density at any instant and is measured in webers per square unit of area. It can be seen that the core material presents a sharp cut-off point between conditions of saturation (i. e. constant B as H increases) and unsaturation. When a reactor is saturated, it will, of course, present a much lower impedance than when unsaturated. If an alternating current voltage is applied to the reactor, it may advance from point 1 on the charging cycle of Fig. 2A along the path of the arrows to point 2 and then back down the other side of the curve to point 1. The cycle from point 1 to point 2 and back to point 1 represents one 360° cycle of the applied alternating current voltage. The location of points 1 and 2 depends upon the amplitude of the applied voltage. If the amplitude of the applied voltage is small enough, saturation may never take place.

The field intensity H varies in direct proportion to ampere-turns which are, in turn, depended upon applied voltage. Therefore, by applying a bias voltage of a particular value to a winding on the core member it can be made to reach saturation in only one direction. Thus, if a direct current bias voltage of one polarity is applied to a winding on the core member, points 1 and 2 will be shifted to the right as indicated by the numerals 1' and 2'. Under these conditions the flux density will never reach saturation in the negative direction, provided the applied voltage is not increased, but will follow the dotted line adjacent point 1'. If a direct current voltage bias voltage of the opposite polarity is applied, the core will saturate in the negative direction only as indicated by the points 1" and 2".

The bias voltages applied to the windings 38 and 40 of transformers 20 and 24, respectively, have opposite polarities as shown so that on one half cycle of the applied voltage from source 10, the core of transformer 20 will saturate while on the other half cycle the core of transformer 24 will saturate. When the polarity of the voltage from source 10 is as shown, capacitor 31 will be charged with the polarity indicated. In Fig. 2B it can be seen that from point $a$ to point $b$ the capacitor 31 is charged. At point *b* the core of transformer 24 will saturate and present a very low impedance; therefore, capacitor 31 will discharge through the lower half of winding 30. On the next or negative half cycle of the applied voltage, the capacitor 31 will be charged from point *c* to point *d* (Fig. 2B) with an opposite polarity. At point *d* the core of transformer 20, being biased in the negative direction, will saturate and capacitor 31 will discharge through the upper half of winding 30.

It should be apparent that the voltages appearing across the upper and lower halves of winding 30 during discharge of capacitor 31 are additive. That is, the polarity of the voltage at the top of the upper half of winding 30 when transformer 20 saturates will correspond to the polarity at the midpoint of winding 30 when transformer 24 saturates. A series of output voltage pulses of the same polarity will, therefore, appear across winding 34 as shown in Fig. 2C.

The bias voltage from source 48 should be of a magnitude such that the core of transformer 32 will saturate when the voltage across the upper or lower half of winding 30, due to the discharge of capacitor 31, reaches its maximum value. When saturation occurs in transformer 32, a resonant circuit is formed which comprises capacitor 33, winding 34 and the output load impedance, not shown, which is connected to output terminals 36 and 37. The resulting rapid discharge of capacitor 33 thus sharpens the output pulses. That is, it causes a rapid increase and decrease in output voltage to produce a spiked effect.

The circuit shown in Fig. 3 is similar to that shown in Fig. 1, the only difference being in the input stage. Elements in Fig. 3 which correspond to those in Fig. 1 are indicated by corresponding prime reference numerals. In series with voltage source 10' and inductor 16' is the lower portion of a saturable reactor 50. Reactor 50 is connected in series with a capacitor 52 and the primary windings 18' and 22' of transformers 20' and 24', respectively. With this arrangement, capacitor 52 will charge on one half cycle of the applied voltage source until reactor 50 saturates. It will then discharge through windings 18' and 22' since reactor 50 now presents a much lower impedance than it did when unsaturated. On the next half cycle of the applied voltage source capacitor 52 will charge with a polarity opposite to that of the preceding half cycle. Reactor 50, being unbiased, will also saturate on this next half cycle to allow capacitor 52 to discharge through windings 18' and 22'. Thus, a series of successive voltage pulses of opposite polarity will be applied to windings 18' and 22' rather than an alternating voltage as was the case in Fig. 1. The operation of the remainder of the circuit, however, is the same as that of Fig. 1.

Although the invention has been described in connection with a certain specific embodiment, it should be readily apparent to those skilled in the art that various changes in form and arrangement of parts can be made to suit requirements without departing from the spirit and scope of the invention.

We claim as our invention:

1. A pulse generator comprising first and second saturable core transformers, primary and secondary windings for each of said transformers, means for connecting said primary windings in series, means for applying a source of voltage across the series combination of said primary windings, a third saturable core transformer having a primary winding, means connecting the primary winding of said third transformer and the secondary windings of said first and second transformers in series, a capacitor connecting the midpoint of the primary winding of said third transformer to the junction of the secondary windings associated with said first and second transformers, and means for deriving an output voltage from said generator.

2. The combination claimed in claim 1 and including means for biasing the cores of said first and second transformers with opposite polarities whereby one core will saturate on one half cycle of said alternating current source whereas the other core will saturate on the other half cycle.

3. A pulse generator comprising first and second saturable core transformers, primary and secondary windings for each of said transformers, a common terminal for said primary windings, a common terminal for said secondary windings, a source of alternating current voltage and an inductor connected in series between the uncommon terminals of said primary windings, a third saturable core transformer having a primary winding connected between the uncommon terminals of the secondary windings of said first and second transformers, a capacitor connected between a midpoint on the primary winding of said third transformer and the common terminal of the secondary windings of said first and second transformers, said capacitor being resonant with the aforementioned inductor, and a secondary winding associated with said third transformer for deriving an output voltage from said generator.

4. In a pulse doubling circuit, the combination of first, second and third saturable inductors all connected in series to form a closed loop, a capacitor connecting the midpoint of one of said inductors to the junction of the other two inductors, alternating current means inductively coupled to said other two inductors for inducing current flow therein, means causing said other two inductors to saturate alternately, a saturable magnetic core member inductively associated with said one inductor, and means for applying a bias voltage to said core member whereby the said one inductor will saturate in one direction only.

5. In a pulse doubling circuit, the combination of first, second and third saturable inductors all connected in series to form a closed loop, a capacitor connecting the midpoint of one of said inductors to the junction of the other two inductors, alternating current means inductively coupled to said other two inductors for inducing current flow therein to alternately charge said capacitor with opposite polarities, and means for causing said one inductor to saturate in one direction only.

6. In a pulse doubling circuit, the combination of first, second and third saturable inductors all connected in series to form a closed loop, a capacitor connecting the midpoint of one of said inductors to the junction of the other two inductors, alternating current means inductively coupled to said other inductors, and bias means inductively coupled to said other inductors for causing the other inductors to saturate alternately.

7. In a pulse doubling circuit, the combination of first, second and third saturable inductors all connected in series to form a closed loop, an impedance element connecting the midpoint of one of said inductors to the junction of the other two inductors, and alternating current means inductively coupled to said other two inductors for inducing current flow therein to alternately reverse the direction of current flow through said impedance element.

No references cited.